United States Patent [19]
Jaffa et al.

[11] 3,795,060
[45] Mar. 5, 1974

[54] DRYER CONSTRUCTION

[75] Inventors: David Jaffa, Fairlawn; Sandor Szarka, Hawthorne, both of N.J.

[73] Assignee: Precision Screen Machines Inc., Hawthorne, N.J.

[22] Filed: Dec. 6, 1972

[21] Appl. No.: 312,787

[52] U.S. Cl. ............... 34/203, 214/16.4 C, 214/21, 34/204, 34/236, 432/121, 432/145
[51] Int. Cl. ............................................. F26b 19/00
[58] Field of Search ...................... 34/159–163, 236, 34/105, 203, 204, 205, 202, 217, 121, 122; 432/134, 135, 143, 162, 146, 145; 214/16.4 C, 21, 16.4 R

[56] References Cited
UNITED STATES PATENTS

| | | | |
|---|---|---|---|
| 3,719,288 | 3/1973 | Schmitt et al. | 214/16.4 R |
| 3,202,115 | 8/1965 | Jones, Jr. | 34/204 |
| 3,280,825 | 10/1966 | Rosing | 34/236 |
| 1,881,063 | 10/1932 | Randolph | 214/16.4 C |
| 1,488,251 | 3/1924 | House | 432/121 |
| 1,107,195 | 8/1914 | Corby et al. | 432/121 |
| 1,890,681 | 12/1932 | Hoppe | 432/145 |
| 740,395 | 10/1903 | Carroll | 214/16.4 |
| 2,342,189 | 2/1944 | Gladfelter et al. | 34/205 |

*Primary Examiner*—John J. Camby
*Assistant Examiner*—Henry C. Yuen

[57] ABSTRACT

This disclosure is directed to a dryer construction having a heating tunnel in which there is disposed an endless conveyor including a series of connected work supporting trays. The conveyor and connected work supporting trays are conveyed through the tunnel in an endless serpentine manner to traverse a series of passes through the heating tunnel in a manner whereby the trays are always maintained in a substantially horizontal face-up position. Lifters or transfer means are provided adjacent the ends of each pass to co-act with the movement of the conveyor means to horizontally lift the respective work support trays between adjacent passes. The arrangement is such that the work support trays are disposed to travel in an endless path within the tunnel in a manner whereby the loading and/or unloading of the workpieces upon the respective trays can be expedited without interruption of the moving conveyor means.

12 Claims, 12 Drawing Figures

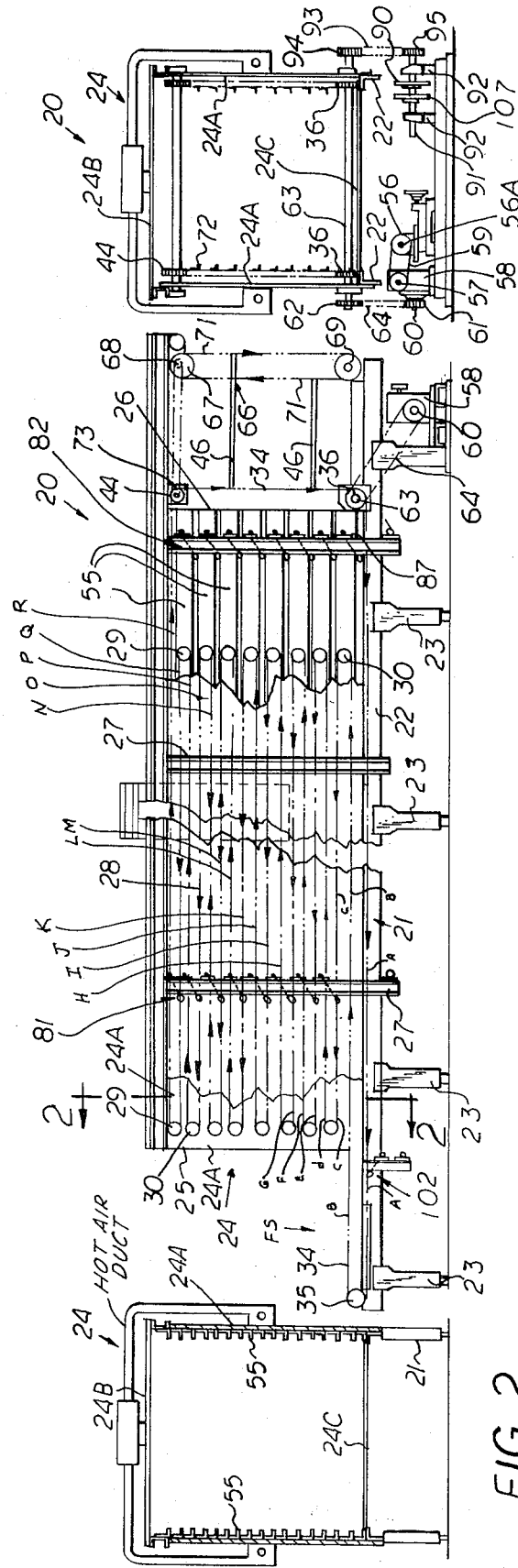

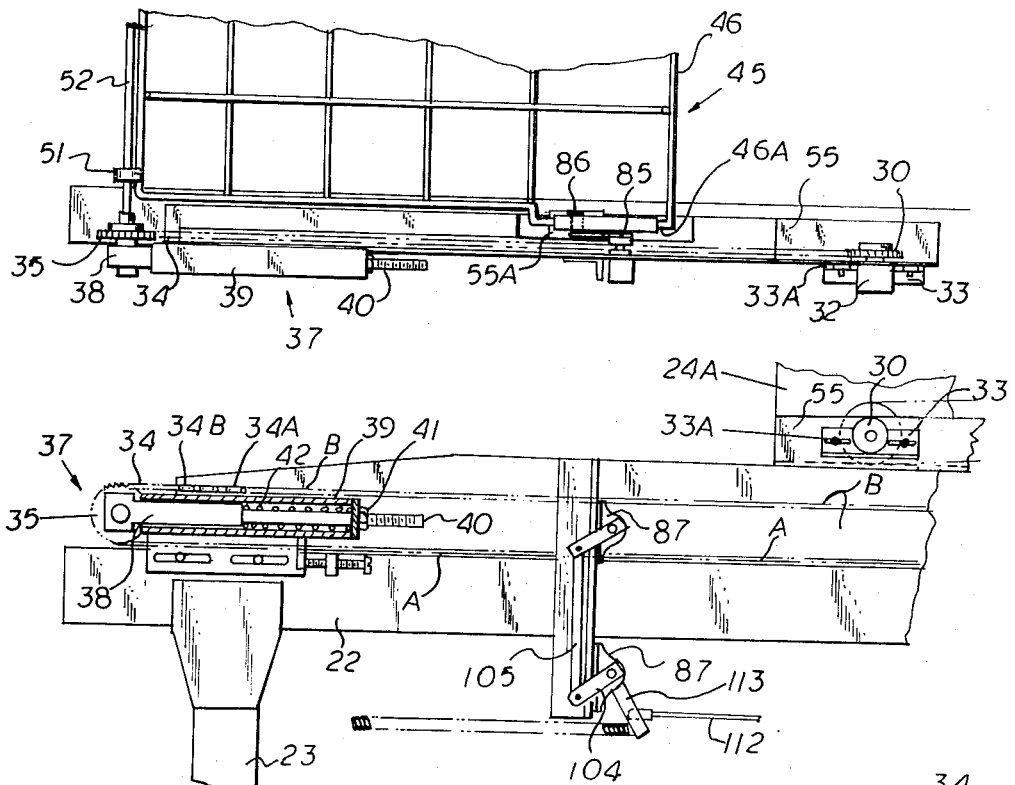
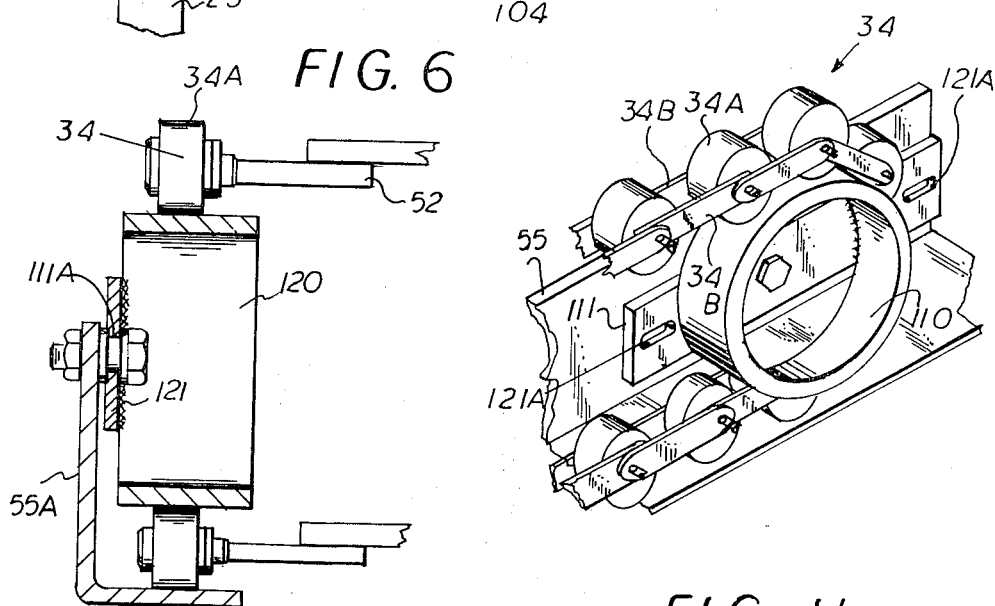

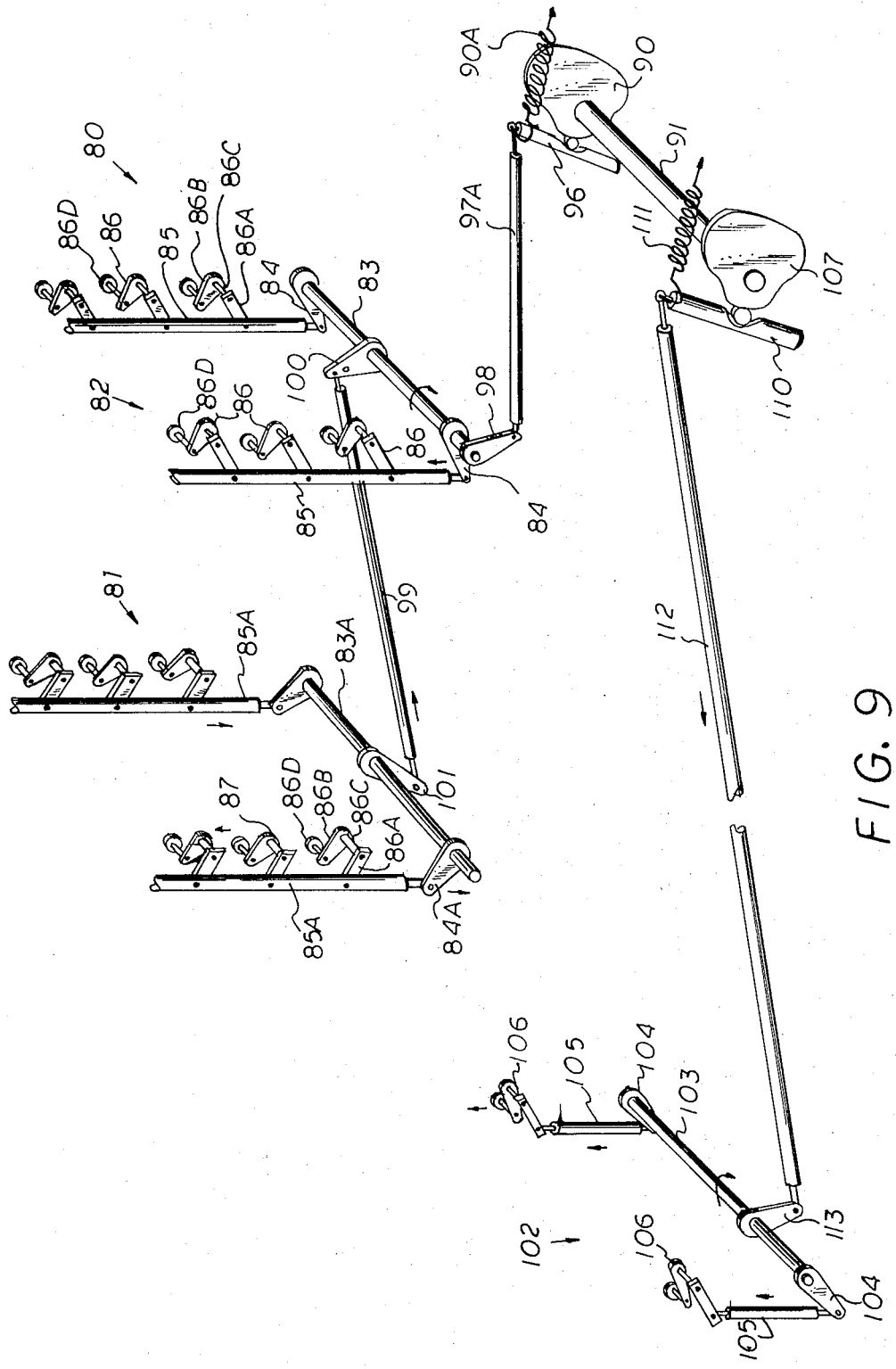

DRYER CONSTRUCTION

PROBLEM AND PRIOR ART

Heretofore in certain types of drying operations, as for example in drying screen printed materials, drying was accomplished by first loading the material or article to be dried on a plurality of vertically stacked trays pivotally mounted on supporting racks. The load racks are then conveyed through a heating tunnel. The disadvantage with this system was that the loading of racks was rendered difficult and time consuming. The loading and unloading of such racks was further aggravated in that frequently the racks became too hot to handle. Also with this system the tunnel lengths were frequently required to be excessively long in order to provide the residence time necessary to effect proper drying. As a result considerable valuable floor space was required to accommodate such long tunnels.

Another known drying system included an endless conveyor which had connected thereto a series of inclined racks on which the workpiece was supported and conveyed through a heating tunnel in an inclined manner. However, with this system the workpiece supported on the inclined trays would frequently tend to slide down the tray and thereby frequently would not be properly exposed to the drying heat as it was conveyed through the tunnel. Also with this type of system, the length of the tunnel was frequently required to be of excessive length and required considerable valuable floor space.

OBJECTS

It is an object of this invention to provide an improved dryer by which maximum drying time may be obtained with a minimal of tunnel length.

Another object is to provide a dryer construction in which a workpiece can be conveyed through a heating tunnel in an endless serpentine manner so as to traverse several passes in traveling therethrough.

Another object is to provide a dryer construction in which the workpiece can be supported in a substantially horizontal position as it is traversed in several passes through a heating tunnel.

Another object is to provide a conveyor type dryer in which the workpiece conveyed through the dryer can be readily loaded and unloaded either at the same end or at opposite ends of the dryer without interruption of the conveyor movement.

Another object is to provide a tunnel conveyor dryer in which the workpiece to be dried is conveyed through the tunnel in several passes whereby the articles to be dried are maintained at all times in a face up position throughout the movement thereof.

BRIEF SUMMARY OF THE INVENTION

This invention is directed to a dryer which comprises a heating tunnel supported on a suitable support frame. The tunnel is defined by opposed wall portions and formed with an inlet opening and an oppositely disposed discharge end portion. An endless or main conveyor means is disposed within the tunnel. The endless main conveyor means is defined by a pair of opposed endless members, as for example, a flexible drive, chains, cables or the like which are suitably threaded over a series of guide means or sprockets supported on the respective side walls of the tunnel. The endless chains are threaded over the end guide means in a serpentine manner to define a plurality of space flights disposed within the tunnel. Spaced along the length of the flexible drive or chain are a series of work support means. One end of the respective work support means is pivotally connected between the flexible drive or opposed chains. The other end of the respective work support means is suitably supported on longitudinally extending rail means extending between adjacent guide means. The arrangement of the conveyor means is such that one of its flights extends beyond the inlet end of the tunnel to provide a feed station whereby the work pieces can be readily loaded onto the respective work supporting trays. A drive means is operatively connected to the conveyor means to advance the conveyor means through the heating tunnel in an endless serpentine manner.

Transfer means are disposed adjacent the end portions of the respective flights which are rendered operative to effectively lift the free end of the work support means between adjacent flights as the pivoted end portion of the work support means rounds the adjacent guide means. An actuating means which is timed or synchronized or rendered responsive to the conveyor drive means is operatively connected to the respective transfer means to coordinate the operation of the transfer means to the speed of the conveyor means.

A transverse conveyor is disposed adjacent the discharge end of the tunnel for effecting the transfer of the work support means in a horizontal manner in moving between the uppermost flight and the lowermost flight of the endless conveyor means. This is attained by driving the transverse conveyor in timed relationship to the speed of the main conveyor and providing the transverse conveyor with a plurality of support stops for supporting the free end of the work support means in moving between the uppermost and lowermost flights of the conveyor means. The timing of the transvers conveyor to the speed of the main conveyor is attained by driving the former from the latter.

FEATURES

A feature of this invention resides in the provision of a dryer in which the material to be dried is conveyed in several passes through the heating tunnel so as to provide for an optimum drying resident time in a minimal of linear tunnel length.

Another feature of this invention resides in the provision of a conveyor for use in a heating tunnel of a dryer comprising opposed endless flexible member, which are threaded about opposed pairs of spaced guide means to define a plurality of spaced flights and having connected therebetween working supporting trays which are pivotally connected to the opposed endless members at one end only.

Another feature of this invention resides in the provision of a dryer having an endless conveyor wherein the workpiece is supported on the conveyor at all times in a face-up position as the material to be dried is conveyed through the tunnel in a series of superposed passes.

Another feature of this invention resides in the provision of a dryer having a conveyor formed of spaced flights having transfer means synchronized to the drive of the conveyor means for effecting the transfer of the work support trays between adjacent flights to insure that the workpiece is maintained in a substantially horizontal face-up position throughout the respective passes.

Another feature of this invention resides in the provision of a dryer having an endless conveyor disposed about spaced guide means which may comprise either rotatably journalled sprockets or fixed bearing members supported on the walls of the dryer.

Other features and advantages will become more readily apparent when considered in view of the description and drawings in which:

FIG. 1 is a longitudinal elevational view having parts shown in section of a dryer embodying the present invention.

FIG. 2 is a sectional view taken along line 2—2 on FIG. 1.

FIG. 3 is an elevational view of the right end or discharge end of the dryer of FIG. 1.

FIG. 6 is a fragmentary elevational side view showing a detail of construction of the dryer of FIG. 1 adjacent the inlet end thereof.

FIG. 7 is a fragmentary top plan view of FIG. 6.

FIG. 9 is a perspective showing of the transfer or lifter means utilized in the embodiment of FIG. 1.

FIG. 10 illustrates a detail of the construction of a modified form of guide for the conveyor of FIG. 1.

FIG. 11 is a perspective view of the modified guide construction of FIG. 10.

Figure 4:
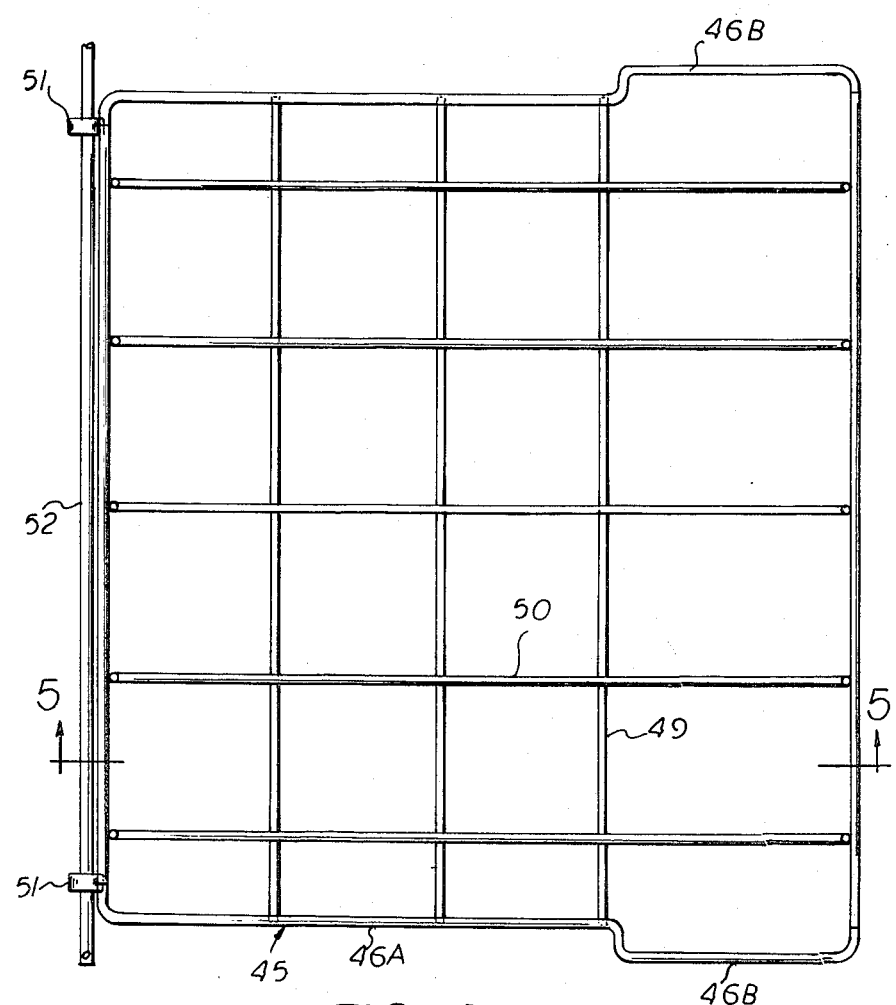
FIG. 4 is a detailed plan view of a work support tray utilized in the illustrated embodiment of the invention.

Referring to the drawings there is shown in FIGS. 1, 2 and 3 a dryer assembly 20 embodying the present invention. As shown, the dryer construction comprises a support frame means 21 which is defined by rectangularly connected structural members to define a base frame 22. The rectangular base frame 22 is supported upon a plurality of longitudinal leg support members 23. Mounted on the base frame 22 is a heating tunnel 24.

The heating tunnel 24 comprises a pair of oppositely disposed side walls 24A, 24A which are interconnected by a top and bottom wall 24B, 24C to define an elongated tunnel of substantially rectangular cross sectional shape. The tunnel defined has an inlet end portion 25 and a discharge end portion 26. It will be understood that suitable reinforcing structural members, e.g., channels 27, may be provided at spaced intervals to reinforce the opposed wall portions 24A, 24A, 24B, 24C of the tunnel.

In accordance with this invention an endless conveyor means 28 is disposed within the tunnel. The endless conveyor 28 is supported and guided for movement in an endless serpentine path through the tunnel about a plurality of spaced guide means 29 and 30; supported on the side walls of the tunnel.

Figure 8:
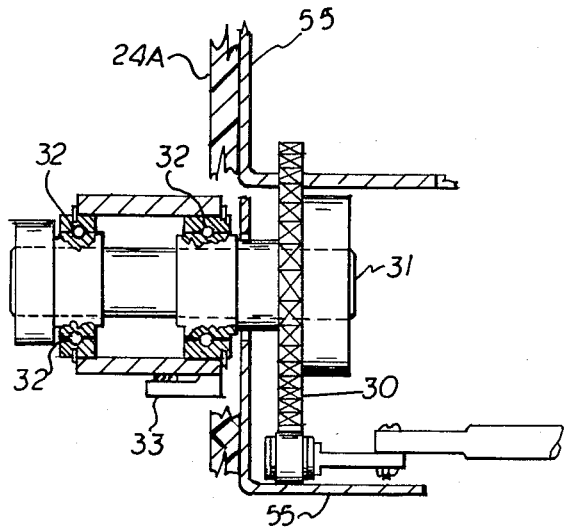
FIG. 8 is a detailed construction of a sprocket guide for the conveyor of FIG. 1.
Figure 12:
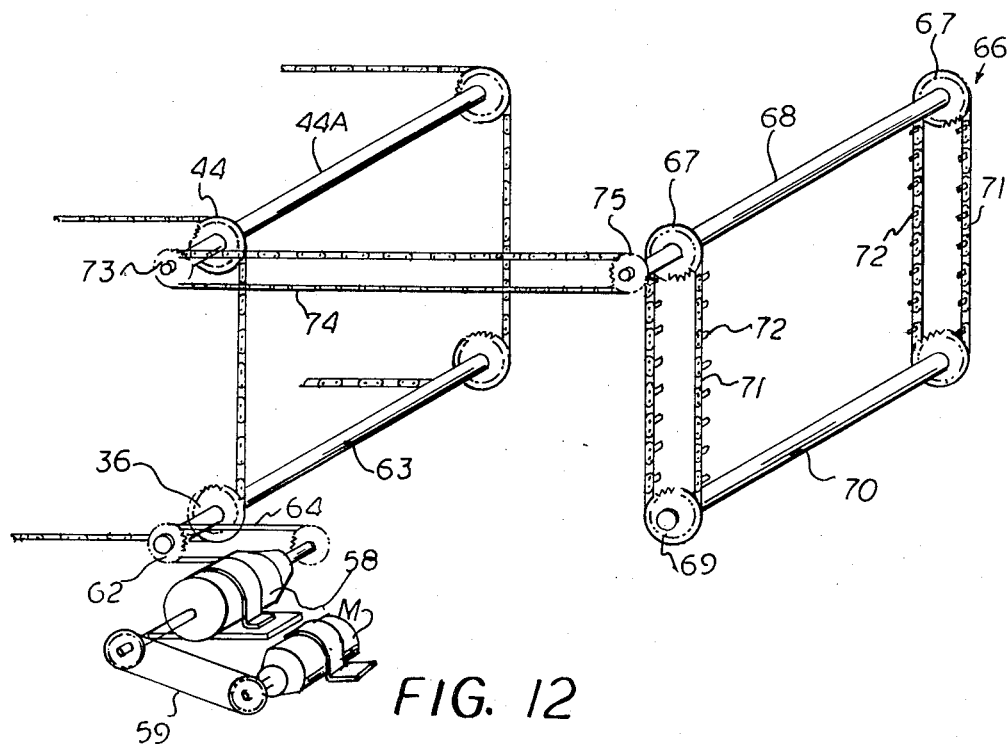
FIGS. 12 is a perspective diagrammatic view of the conveyor means adjacent the discharge end of the illustrated dryer of FIGS. 1 to 3.

Referring to FIG. 8 one form of guide means 29 or 30 may comprise a sprocket or pulley 30 connected to a shaft 31 which is rotatably journalled in suitable bearings 32 disposed on the exterior side wall 24A of the tunnel 24. If desired the bearing mounting 33 for the respective sprockets 29 may be provided with appropriate elongated slots 33A to provide for limited longitudinal adjustment of the sprocket 29 or 30 relative to the side wall 24A of the tunnel.

As best seen in FIG. 1 a plurality of opposed sprockets 29, 30 are rotatably journalled on the respective side walls 24A, 24A of the tunnel 24 at vertically spaced intervals. In the illustrated form of the invention eight pairs of opposed sprockets 29, 30 are illustrated adjacent the inlet and outlet ends of the tunnel and are arranged to define the end turns of a plurality of spaced flights or passes C to R as will be hereinafter described.

It will be noted in FIG. 1 that a portion of the base frame 21 adjacent the inlet end 25 of the tunnel 24 projects beyond the inlet to the tunnel.

The conveyor means comprises a pair of opposed endless flexible members, as for example, a chain 34, which is arranged to be threaded over a pair of front and rear end sprockets 35, 36 rotatably journalled on the support frame 22 and over the respective pair of guide sprockets 29, 30 mounted on the adjacent side wall portion of the tunnel. Accordingly as best seen in FIG. 1, the endless chain 34 is threaded over the front and rear sprocket 35, 36 and adjacent pairs of guide sprockets 29, 30 to define a serpentine pass having a plurality of spaced flights A to R. The arrangement of the serpentine passes is such that at least one flight, e.g., flight A & B extends beyond the inlet end of the tunnel to define a feed station. F.S., at which the workpieces to be dried may be conveniently loaded onto the conveyor means at the inlet end of the tunnel.

To effect adjustment of the tension in the conveyor chain 34 a means 37 is provided for effecting limited longitudinal adjustment of the opposed front sprockets 35. As best seen in FIGS. 6 and 7 the means 37 for adjusting tension comprises a slide mount 38 to which the sprocket 35 is journalled.

The slide mounts 38 for the front sprockets 35 are respectively slidably supported within a sleeve 39 mounted on the base frame 22. Operatively connected to the slide mount 38 is an adjusting screw 40 having a nut 41 threaded thereto whereby the rotation of the nut in one direction or the other causes the slide mount and the connected front sprocket 35 to be adjusted as necessary to control the degree of tension on the conveyor chains 34. If desired a spring means 42 may be disposed about the adjusting screws 40 to exert a spring force on the end of the slide mount 38.

The endless flexible members 34 of the conveyor means, in the illustrated embodiment comprise link type chains having oversized rollers 34A interposed between the adjacent link 34B. It will be understood that the spacing of the rollers 34A along the link chain is such so that the chain can be readily threaded over the end sprockets 35, 36 and the sprocket guides 29, 30 to define a series of spaced flights A to R within the oven or dryer tunnel. The respective conveyor chains 34 are threaded about the front sprocket 35, the first or lowermost rear guide sprocket, and thence successively over the respective front and rear guide sprockets 29, 30 as indicated in FIG. 1. The chain 34 after passing the uppermost front guide sprocket is threaded over an upper rear sprocket 44 connected to a top support member of the tunnel and thence downwardly around the rear sprocket 36 and underneath the front sprocket 35. The threading of the chains about the respective sprockets 35, 36, 29, 30 and 44 is such that an endless conveyor chain is disposed adjacent each side 24A, 24A of the tunnel 24 to define an endless serpentine pass.

Figure 5:
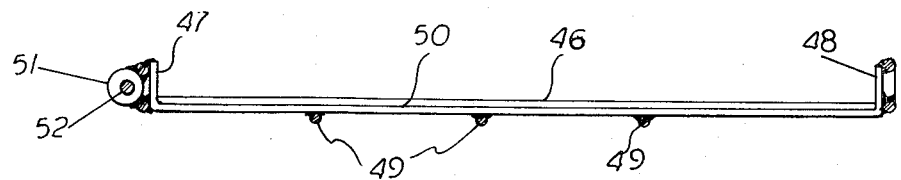
FIG. 5 is an end elevation view of the work support tray of FIG. 4.

Connected between the opposed chains 34 extending along the opposite side walls 24A, 24A of the tunnel are a plurality of work support means 45. In the illustrated embodiment the work support means 45 comprises an open wire or rod tray 46. As best seen in FIGS. 4 and 5 the work support means 45 is formed of bar or round wire-like stock 46A which defines the outer periphery of the tray 46. The front and rear edges of the tray may be upwardly bent as at 47 and 48 to define a slight dish-shaped tray 46. Criss-crossing members 49 and 50 are provided to define an open lattice construction. Connected to the forward end of the work support means or tray are spaced lugs 51 adapted to be received in a transverse pivot bar 52 extending between opposed chain members 34. The arrangement is such that one end of the tray only is pivotally connected to or between the opposed chains 34. The other end is free of the chain.

As best seen in FIG. 4, the peripheral frame 46A of the tray 46 at the free end is provided with laterally extended portions 46B to provide a support for the free end as will be hereinafter described so that the work support means 45 can be maintained horizontal throughout its travel through the tunnel.

As best seen in FIGS. 2 and 3 a plurality of rail members 55 is extended longitudinally of the tunnel between the front and rear guide sprockets 29 and 30.

The respective rails 55 are oppositely disposed and they are arranged to support the intermediate length of the chains between guide sprockets 29, and 30. Thus it will be noted that the rollers 34A of the chains are supported in rolling engagement on the respective rails extending between corresponding guide sprockets. Also the rails support the free end of the respective work support means 45 supported between opposed chains as the lateral extension 46B thereof is arranged to slide along the rails 55. In the illustrated embodiment the rails 55 may comprise simply of structural angle members having its vertical leg secured to the spaced vertical supports 27 of the tunnel and having its other leg horizontally disposed inwardly to support the chain and the free end of the connected tray 46. In the preferred construction as shown in FIG. 1, the rails 55 secured to the spaced upright structural members 27 comprise the structural frame for the tunnel, with the side walls 24A, and the top and bottom wall portions comprising simply of thermal panels which can be readily set in place upon the external portion of the tunnel framing.

From the foregoing it will be noted that the conveyor means comprises the opposed chains 34, 34 each being threaded over a series of end sprockets 35 and 36 and a series of guide sprockets 29, 30 to define an endless serpentine path having a series of spaced superposed flights and having connected between the opposed chains 34, 34 a series of spaced trays 46 which are pulled along the serpentine path as the chains are driven.

The drive for the conveyor means described includes a drive motor, e.g., an electric motor 56 located adjacent one end of the frame 22. The output shaft 56A of the motor 56 is connected in driving relationship to the input shaft 57 of a transmission means or speed reducer 58 by a flexible drive coupling, e.g., belt or chain drive.

The output shaft 60 of the transmission or speed reducing means 58 has journalled thereto a drive sprocket or pulley 61 which is connected in driving relationship by a flexible drive 64 to a driven sprocket 62 mounted on the main drive shaft 63 to which the rear or driving sprocket 36 of the conveyor is connected. As best seen in FIG. 1 whenever the motor 56 is actuated the conveyor chain 34 is driven in the direction indicated by the arrows in FIG. 1.

Disposed adjacent the discharge end 26 of the tunnel 24 there is provided a transfer conveyor 66. As will be hereinafter described the transfer conveyor is provided to facilitate the transfer of the respective trays 46 in moving between the uppermost flight R and the lowermost flight A as the pivoted end of the respective trays 46 round the end sprocket, e.g., sprocket 44.

The transfer conveyor comprises of a pair of upper sprockets 67 journalled to an upper shaft 68 suitably supported on the upper superstructure of the tunnel 24. A corresponding pair of lower sprockets 69 are joined about a lower shaft 70 suitably journalled in the base frame. Threaded about corresponding upper and lower sprockets 67 and 69 is an endless chain 71. Connected to the chain 71 of the transfer conveyor 66 are suitable support stops 72 for receiving and supporting thereon the lateral projections 46A of the respective trays 46. As will be hereinafter described the free end of the trays 46 advancing beyond end sprocket 44 are successively received in the support stops 72 as the pivoted end of the respective trays 46 round end sprockets 44.

The arrangement is such that the transfer conveyor 66 is timed or synchronized to the movement of the main conveyor 34 by an interconnected drive. The interconnecting drive comprises a driving sprocket or pulley 73 connected to the shaft 44A to which sprocket 44 is journalled. A flexible drive 74 connects the driving sprocket 73 in driving relationship to a complementary driven sprocket or pulley 75 journalled to the upper shaft 68. Accordingly it will be noted that the time of the transfer conveyor is geared to the speed of the main conveyor 34 through the medium of the interconnecting drive means 73, 74 and 75. Disposed in spaced relationship with respect to the front and rear guide sprockets 29, 30 which define the respective superposed flights or passes C to R and adjacent the front driving sprocket 35 are associated transfer or lifter means, which are operative to effect the lifting of the free end of the work support means 45 between adjacent flights as the pivoting connected end portion of the work support means rounds the adjacent sprocket means. The arrangement is such that the associated transfer means is spaced from the respective front and rear sprockets by a distance equal substantially to the length of the work support means.

Referring to FIGS. 1, 3 and 9, the transfer system includes a series of lifters which are timed to lift the free end of the associated tray as the other end of the tray 46 is rounding the corresponding sprocket or guide means so that the trays are maintained in a substantially horizontal plane as the trays are successively lifted or moved between adjacent flights or passes A to R.

As best seen in FIG. 9 the transfer or lifting system 80 comprises a set of front lifters 81 and a set of back lifters 82. The respective front and rear set of lifters 81 and 82 are spaced adjacent the front and rear set of guide means 29 and 30.

The rear set of lifters 82 comprises a shaft or rod 83 which extends transversely of the tunnel and is rotatably journalled in suitable bearings downstreamwise of the rear guides 29. Journalled to the opposed ends of shaft 83 are lever arms 84 pivotally connected to an associated tie bar 85 which is mounted adjacent the opposed side walls of the tunnel for limited reciprocal movement.

Operatively connected to the respective tie bars 85 are a series of vertically spaced lifting cranks 86. The number of lifting cranks 86 connected to each of the respective tie bars 85 corresponded to the number of space flights of the main conveyor disposed within the tunnel. The lifter cranks 86 connected to the opposed tie bars 85 are paired and arranged to act in unison on the free end of the respective trays as each tray is required to be shifted between adjacent flights or passes.

The respective lifter cranks 86 include a pair of arms 86A, 86B interconnected by a bearing pin 86C. The bearing pin 86C of each crank is suitably journalled in a suitable bearing 87 to the side of the tunnel of the type shown in FIG. 6. The free end of arm 86A of each crank is pivoted to its respective tie bar 85. A lifter bar 86D is connected to the free end of arm 86B.

The actuating means for operating the rear set of lifters comprises a timing cam 90 and a transmission set of linkage to render the rear set of lifters 82 responsive to the timing cam 90.

As best seen in FIGS. 3 and 9 the timing cam 90 comprises a contoured cam journalled to a shaft 91 suitably supported in bearing 92 on the frame of the dryer. The timing cam 90 is driven through a flexible coupling or drive 93 interconnecting a driving sprocket 94 connected to the main drive shaft 63 and a driven sprocket 95 connected to the shaft 91 of the timing cam.

Operatively connected to the time cam is a cam follower arm 96, one end of the follower arm being pivoted to a fixed support. A spring 96A urges the free end of the follower lever in engagement with the cam 90. A transmission linkage 97 is interconnected between the follower lever 96 and the arm 98 journalled to one end of shaft 83. The arrangement is such that rotation of the timing cam 90 effects periodic actuation of the rear set of lifters. The timing of the lifters is such that they will coordinate with the rounding of the pivoted end of the tray about their respective guide means 29 to facilitate the shifting of the trays 46 between adjacent flights, as the respective trays are conveyed through the heating tunnel.

The front set of lifters 81 are similarly constructed to the rear set of lifters 82. As shown in FIG. 9 the front set of lifters 81 includes opposed tie bars 85A connected to arms 84A, journalled to a cross shaft 83A. The respective lifter cranks 87 are identical to those previously describe and are arranged to operate to lift the respective trays as the connected end of the trays 46 round the front set of guide means 30.

It will be understood that the actuation of the front lifters 81 is coordinated with the actuation of the rear set of lifters 82. This is attained by coupling the operation of the front and rear set of lifters 81 and 82 by an interconnecting coupling bar 99. As shown the coupling bar 99 is connected at one end to arm 100 journalled to shaft 83 and connected at its other end to an arm 101 journalled to shaft 83A. The phase relationship of arms 100 and 101 relative to its respective shaft 83, 83A determines the phase sequencing or operation of the respective front and rear sets of lifters. Accordingly as the timing cam 90 is driving from the main drive shaft 63, the operation of the cam 90 will time the sequencing actuation of the front and rear lifters as the pivoted end of the trays rounds the respective guide means 29 and 30 so that the lifter will raise the free end of the trays as the pivoted end rounds the adjacent end guide means.

As best seen in FIG. 7, the respective rail members 55 are provided with cut-out portions or slots 55A in the vicinity of the lifter bar 86D. It will be understood that the length of the slot 55A is greater than the length of the lateral extension 46B of the trays 46. Thus as the lateral extension of the trays 46 slides over the slot or cut-out 55A, the trays are in position to be acted upon by lifters so as to be raised thereby. As the trays are raised by the lifters, the extended portion 46B is elevated through the corresponding slot 55A of the next adjacent rail, where continued movement of the conveyor chain 31 causes the trays to advance along the next adjacent rail and off the lifter bar 86D and onto the adjacent rail.

Another set of lifters 102 is located adjacent the feed end of the tunnel. This set of lifters is provided to effect the lifting of the trays returning to the feed end of the machine. As best seen in FIG. 9, the lifter set 102 comprises a cross shaft 103 journalled adjacent the front sprockets 35. Journalled to the opposed ends of shaft 103 are arms 104. Connected to the free end of arms 104 is a tie bar 105 mounted for reciprocal movement. A lifting crank 106 similar in construction to that hereinbefore described is connected to tie bar 105.

The actuating means for lifter set 102 comprises a second timing cam 107 which is joined on shaft 91 so as to be driven with cam 90. Operatively associated with timing cam 107 is a follower lever 110 similar to follower 96. A spring 111 biases lever 110 in engagement with cam 107. A transmission bar 112 is connected at one end to the follower 110 and to an arm 113 journalled to shaft 103. In operation the operation of the lifter bar 106 is rendered responsive to the operation of the timing cam 107.

Suitable heaters (not shown) are provided for introducing the heating medium, as for example, hot air into the heating tunnel.

Depending on the nature of the material to be dried, it may be possible to effect the drying without the application of heat. That is the material or workpieces may be dried simply by exposing them to ambient air whereby the resident time required for drying is controlled by the number of passes through the tunnel. Thus the apparatus 20 described may be utilized with or without the application of heat depending upon the nature and characteristics of the material to be treated. Also it will be understood that if heat is required, it can be supplied by any suitable heat generating means, e.g., burners burning either oil and/or gas, or may be supplied electrically; and suitably circulated by the use of blowers or induction fans.

The dryer described is particularly applicable for effecting the drying of various screen printed articles. However, it will be understood that the dryer may be used for other purposes to accomplish the drying of various items as known to those skilled in the drying arts.

In operation, the actuation of the motor means 56 will effect the drive of the main conveyor means 34 through the tunnel as indicated in FIG. 1. Because the forward end of the conveyor, e.g., flight B, extends beyond the inlet end of the tunnel, the articles to be dryed can be readily fed onto the respective trays 46 as the returning trays are lifted between flights A and B as will be described. As the trays are advanced through the tunnel, the heating medium or ambient air circulating therethrough will effect the drying of the article. Because of the open lattice work of the respective trays 46, it will be noted that circulaating hot air or drying medium can be freely circulated therethrough to effect optimum drying of the article supported thereon.

As the lifters 81, 82 and 102 are driven from the main drive shaft 63 and as they are rendered responsive to the respective timing cams 90 and 107 the respective lifters are actuated to effect a shifting of the respective trays between adjacent flights of the endless pass in a manner whereby the trays are always maintained horizontal. Thus the lifters adjacent the respective guide means 29 and 30 and front sprocket 35 cooperate therewith to effect vertical lifting of the trays as the connected ends of the trays round the respective sprockets or guide means.

The trays moving off the uppermost flight R are supported at their free end by a vertically disposed transfer conveyor 66 so that in moving between the uppermost flight R and lowermost flight A the respective trays are maintained in a horizontal position. Also the spacing between trays in moving between the upper and lowermost flights can be maintained so as to facilitate unloading of the trays at the discharge end. If desired the articles may be maintained on the trays for return to the feed end of the machine where the feed end may form the station for both feeding and discharging of articles carried on the trays.

With the construction described it will be noted that the respective passes enable the goods to be exposed to maximum heating or drying time in a minimal length of tunnel. Also the arrangement is such that the heating or drying medium can be directed to all sides of the article for maximum drying efficiency. The successive passes of the trays through the heating tunnel is further effected in a manner whereby the articles are safely maintained in a horizontal position by effecting transfer between respective flights in a simple and effective manner.

FIGS. 10 and 11 illustrate a modified form of the invention. This form of the invention is identical to that previously described except that the structure thereof can be further simplified by utilizing fixed bearing members 120 as guide means instead of rotatably journalled sprocket members 29 or 30.

In the modified form as shown in FIGS. 10 and 11 a fixed bearing or annular member 120 is suitably secured to a mounting bracket 121 which can be suitably secured to the vertical leg 55A of an adjacent rail member 55. The mounting bracket 121 may be provided with opposed slotted openings 121A to provide for limited lateral adjustment in mounting the fixed bearings 120 to the side wall of the tunnel. As best seen in FIG. 11 the main conveyor roller chain 34 is threaded or guided about the fixed guides 120 in a manner described with respect to FIG. 1. Because of the rollers 34A of chain 34, friction between the chain 34 and fixed bearings 120 can be minimized. With the use of the fixed guide means 120, this construction of the dryer is greatly simplified as the need for rotatably mounted sprockets and associated bearings can be eliminated. In all other respects the operation of the modified construction is similar as described. The bearing member 120 can be simply a structural disk or annular member which may be provided with or without a groove for accommodating or guiding the rollers of the moving conveyor chains or means therearound.

While the present invention has been described with respect to various embodiments thereof, it is understood that variations and modifications may be made within the scope of this invention.

What is claimed is:

1. A dryer comprising:
   a heating tunnel having opposed side walls,
   an endless conveyor means disposed within said tunnel,
   said endless conveyor means including a pair of spaced apart opposed flexible conveyor members,
   a plurality of work supporting means connected between said flexible conveyor members,
   each of said work supporting means including a tray,
   guide means supported adjacent the side walls of said tunnel adjacent the ends of the tunnel for guiding each of said flexible conveyor members in a serpentine manner through said tunnel to define a plurality of spaced flights,
   means for pivotally connected one end portion of each of said trays to and between said flexible conveyor members,
   rail means extending along each side wall portion between said guide means,
   said rail means supporting the other end portion of said trays,
   means for effecting the drive of said flexible conveyor members and connected trays,
   independent transfer means disposed adjacent the ends of the respective flights for effecting the transfer of said other end portion of said trays between adjacent spaced flights,
   and activating means operatively connected to said drive means for timing the actuation of said transfer means relative to the movement of said conveyor means and connected trays through said tunnel.

2. The invention as defined in claim 1 wherein each of said flexible conveyor members each comprises a roller link chain,
   and said guide means including a series of spaced apart sprockets over which each of said roller link chains is threaded,
   and said rails disposed between said guide means supporting said chain intermediate adjacent sprockets.

3. The invention as defined in claim 1 wherein said guide means includes stationary bearing means, and
   said endless conveyor means includes opposed roller link chains which are threaded about said fixed bearing means.

4. The invention as defined in claim 1 wherein said transfer
   means comprises a series of complementary lifters disposed adjacent the opposed ends of said spaced flights for effecting the lifting of the free end of said trays to the next adjacent flight as the connected end of said work support means rounds said end guide means.

5. The invention as defined in claim 1 wherein said tunnel includes an inlet end and a discharge end,
   and at least one of said flights has an end portion extending beyond said inlet end of said tunnel, and an independent transfer conveyor means disposed adjacent the outlet of said tunnel and spaced from the ends of the respective flights, said transfer conveyor means comprising a pair of opposed end-less members, spaced apart guide means over which said latter endless members are threaded so as to be disposed normal to said spaced flights, stop supports spaced along said latter endless members adapted for supporting said other end of said work support means in transfering said work support means between the upper and lowermost flights.

6. The invention as defined in claim 1 wherein said transfer means comprises a series of lifters rotatably journalled adjacent the opposed end portions of said spaced flights, said lifters including a lever arm rotatably journalled in a fixed bearing adjacent the opposed ends of each of said flights, and a tie bar interconnecting the respective lifter arms to effect a simultaneous actuation of the lifters at each end of said flights, and said actuating means being operatively connected to said tie bar.

7. The invention as defined in claim 6 wherein said actuating means includes:

a timing cam connected in driving relationship to said drive means, a cam lever cooperatively associated with said timing cam, and an interconnecting link operatively interconnecting said cam lever and tie bar whereby the latter is rendered responsive to the operation of said timing cam.

8. A dryer comprising:
a support frame,
a tunnel having opposed side walls supported on said frame,
said tunnel having an inlet end portion and a discharge end portion,
an endless conveyor means disposed within said tunnel,
said endless conveyor means including a pair of opposed endless chains,
each of said chains being disposed adjacent a side wall of said tunnel,
each of said chains having a series of rollers spaced therealong,
a series of opposed guide means supported on the side walls of said tunnel,
said endless chains being threaded over said guide means in a serpentine manner to define a plurality of spaced flights,
a plurality of work support means having opposed end portions,
means for pivotally connected connecting end portion of said work support means to and between said opposed chains,
a plurality of vertically spaced rail means extending between said guide means adjacent the respective side walls for supporting said chain defining said flights, said work supporting means having means adjacent the other end thereof for supporting said other end on said opposed rail means, one of said flights extending beyond the inlet end of said tunnel, a drive means for effecting the drive of said conveyor means and connected work support means whereby the latter are advanced through said tunnel in a serpentine manner, independent transfer means adjacent the end portion of the respective flights operative to effectively lift said other end of said work support means between adjacent flights as the pivoted end portion of said work support means rounds the respective guide means, actuating means operatively associated to said transfer means to synchronize the operation thereof to the speed of said endless conveyor means and connected work support means, and an independent transfer conveyor means disposed adjacent the discharge end of said tunnel for effecting the transfer of said work support means between the uppermost flight and the lowermost flight, said transfer conveyor including a pair of endless flexible members, space guide means for guiding said transfer conveyor in an endless path adjacent said discharge end of the tunnel, support stops spaced along the endless flexible members of said transfer conveyor, said stops being adapted to support said other end of said work support means as said work support means is transfered between the respective upper and lowermost flights, and means for driving said transfer conveyor in synchronization with the speed of said endless conveyor means, and means for heating said tunnel.

9. The invention as defined in claim 8 wherein said opposed guide means include a series of rotatably journalled sprockets over which said conveyor chains are threaded.

10. The invention as defined in claim 8 wherein said guide means include a series of fixed bearing means about which said conveyor chains are threaded.

11. The invention as defined in claim 8 and including means for adjusting the tension of said conveyor chains.

12. The invention as defined in claim 9 wherein independent said transfer means includes:

a first set of lifters disposed adjacent the opposed ends of the respective flights disposed within said tunnel, and a second set of lifters disposed adjacent the extended end of said flight extending beyond the inlet end of said tunnel, and said actuating means being operatively connected to said first and second set of lifters which are rendered responsive to the speed of said conveyor means.

* * * * *